United States Patent [19]

Maruoka et al.

[11] Patent Number: 5,502,100
[45] Date of Patent: Mar. 26, 1996

[54] COATED GOLF BALL

[75] Inventors: Kiyoto Maruoka; Kuniyasu Horiuchi, both of Kobe, Japan

[73] Assignee: Sumitomo Rubber Industries, Ltd., Hyogo, Japan

[21] Appl. No.: 267,514

[22] Filed: Jun. 29, 1994

[30] Foreign Application Priority Data

Jun. 29, 1993 [JP] Japan .................. 5-158639

[51] Int. Cl.$^6$ .................. C08K 3/22; A63B 37/12
[52] U.S. Cl. .................. 524/430; 524/908; 273/235 A; 273/235 R; 273/220
[58] Field of Search .................. 273/235 A, 235 R, 273/220; 524/908, 430

[56] References Cited

U.S. PATENT DOCUMENTS 4,679,794  7/1987  Yamada .................. 273/235 R
4,679,795  7/1987  Melvin .................. 273/235 R
5,029,870  7/1991  Concepcion .................. 273/235 A

*Primary Examiner*—Joseph L. Schofer
*Assistant Examiner*—I. Zemel
*Attorney, Agent, or Firm*—Birch, Stewart, Kolasch & Birch

[57] ABSTRACT

The present invention provides a coated golf ball having beautiful appearance, wherein the whiteness thereof is enhanced by inhibiting the enhancement of blueness. The golf ball body of the coated golf ball is coated with a white paint containing titanium oxide as a main pigment. The white paint comprises 45 to 60% by weight of titanium oxide, 0.005 to 0.20% by weight of a blue pigment and 0.001 to 0.06% by weight of a red pigment, based on 100% by weight of a solid content of a coating. The weight ratio of the blue pigment to the red pigment is 0.9 to 5.

11 Claims, No Drawings

COATED GOLF BALL

FIELD OF THE INVENTION

The present invention relates to a golf ball coated with a paint. More particularly, the present invention relates to a coated golf ball wherein the whitening of color tone is enhanced.

BACKGROUND OF THE INVENTION

Since a golf ball is used on green grass under sunlight, it is necessary to enhance its whiteness in order to make its appearance beautiful. Accordingly, the golf ball body is generally coated only with a clear paint or with an enamel paint containing a white pigment and a clear paint.

In order to enhance the whiteness of the golf ball there can be used a method of increasing the amount of titanium oxide as a white pigment thereof. However, the amount of titanium oxide which can be formulated in the paint is limited.

In order to improve the whiteness of the golf ball, Japanese Patent Publication No. 4-50029 suggests formulating a suitable amount of blue and violet pigments in a white paint containing titanium oxide as the main pigment. However, blueness is also enhanced in addition to whiteness, which results in a blackish color.

SUMMARY OF THE INVENTION

Under these circumstances, and in order to solve the above problem, the present inventors have undergone an intense investigation. As a result, the present invention has been completed.

The main object of the present invention is to provide a coated golf ball having a beautiful appearance, wherein the whiteness is enhanced by inhibiting the enhancement of blueness.

This object as well as other objects and advantages of the present invention will become apparent to those skilled in the art from the following description.

That is, the present invention provides a golf ball in which the surface of the golf ball body is coated with a white paint containing titanium oxide as a main pigment, said white paint comprising 45 to 60% by weight of titanium oxide, 0.005 to 0.20% by weight of a blue pigment and 0.001 to 0.06% by weight of a red pigment based on 100% by weight of the solid content of the coating, and wherein the weight ratio of the blue pigment to the red pigment is 0.9 to 5.

DETAILED DESCRIPTION OF THE INVENTION

As the white paint, there can be used an epoxy, an acrylic or an urethane paint. Particularly, the urethane paint is preferred. For example, a white paint prepared by reacting an active hydrogen-containing compound (e.g. polyester polyol, polyether polyol, etc.) as a main material with an isocyanate compound as a curing agent is preferred. As the isocyanate compound, a 1,6-hexamethylene diisocyanate modified material (e.g. biulet material, trimethylolpropane modification, trimer, etc.) is preferred. A tolylene diisocyanate modified material is also preferred.

The white paint contains titanium oxide as a white pigment. The amount is suitably 45 to 60% by weight based on the solid content of the coating. When the amount of the white pigment is smaller than 45% by weight, the coating hiding power becomes inferior and, therefore, the preferable white color can not be obtained. When the amount exceeds 60% by weight, the physical properties of the coating become inferior, and it is not preferred. The amount is preferably 50 to 55% by weight.

In addition to the above components, various additives, curing catalysts and diluents are formulated in the white paint. Examples of such additive include ultraviolet inhibitors, fluid agents, sealing pigments, fluorescent agents, fluorescent brighteners and the like. The amount of these additives is 0.1 to 10% by weight based on the solid content of the coat.

As the fluorescent agent or fluorescent brightener contained in the white paint, for example, there are those which are normally known and are used for golf ball. Examples thereof include 2,5-bis[5'-t-butylbenzoxazolyl (2)]thiophene (commercially available from Japan Ciba Geigy Co., Ltd. as Yubitex OB), 7-(2h-naphthol( 1,2-d)-triazol-2-Y1)-3-phenyl-cusline (commercially available from Sanzos Co. as Leucopure EGM), biazoline derivative (commercially available from Mobey Chemical Corporation as Phorwhite K-2002), oxazoles (commercially available from Sumitomo Chemical Co., Ltd as Whitefullar HCS, PCS, B), fluorescent brightener (commercially available from Hoechst Japan Co. as Hostalux KCB) and the like. The amount thereof is 0.005 to 1.0% by weight based on the solid content of the coating.

Examples of the diluent formulated in the white paint include ketones such as acetone, methyl ethyl ketone, etc.; aromatic hydrocarbons such as toluene, xylene, etc.; esters such as ethyl acetate, etc. The amount of the diluent is not specifically limited, but is 30 to 80% by weight.

As the blue pigment, for example, phthalocyanine blue, ultramarine blue or indanthron blue, or a mixture thereof can be suitably used. The amount of the blue pigment is 0.005 to 0.20% by weight, preferably 0.01 to 0.08% by weight, based on the solid content of the coating.

As the red pigment, for example, quinacridone magenta or permanent red, or a mixture thereof can be suitably used. The amount of the red pigment is 0.001 to 0.06% by weight, preferably 0.008 to 0.04% by weight, based on the solid content of the coating.

Such a paint is applied on the golf ball body in a thickness of 5 to 30 μm. The golf ball body may be an one-piece golf ball obtained by vulcanizing and molding a cis-1,4-polybutadiene rubber. Further, the golf ball body may also be a thread wound golf ball comprising a thread wound core and a cover layer mainly composed of transpolyisoprene provided thereon.

By coating the golf ball body with the above paint, a coated golf ball with a color tone having a Tw value of not more than 10, an a value of 0.01 to 0.6 and a Tw/Wcie value of 0.005 to 0.05 can be obtained. When these values are not within the above range, the resulting coated golf ball lacks the desired whiteness. Preferably, the a value is 0.1 to 0.5 and the Tw/Wcie value is 0.02 to 0.04. These Tw a and Tw/Wcie values are measured by a colorimeter (available from Minolta Co., Osaka, Japan).

In the production of the coated golf ball of the present invention, the clear paint may be applied after the white paint is applied to the golf ball body. The clear paint is one which essentially contains no pigment, and there can be used such materials as an epoxy, acrylic or urethane paint. The clear paint is known as to the production of the golf ball.

According to the present invention, a coated golf ball having a beautiful appearance, wherein whiteness is enhanced by inhibiting the enhancement of blueness, can be obtained.

EXAMPLES

The following Examples and Comparative Examples further illustrate the present invention in detail but are not to be construed so as to limit the scope thereof.

Examples 1 to 5 and Comparative Examples 1 to 3

Paints A to E (Examples) and paints F to H (Comparative Examples) were prepared by mixing the components shown in Table 1 according to a conventional method.

TABLE 1

|  | Example No. |  |  |  |  | Comparative Example No. |  |  |
|---|---|---|---|---|---|---|---|---|
|  | A | B | C | D | E | F | G | H |
| [Formulation] Resin to be used is urethane in all Examples and Comparative Examples (Amount: % by weight based on the solid content of the coat) |  |  |  |  |  |  |  |  |
| White pigment (Titanium oxide) | 53 | 53 | 53 | 53 | 53 | 53 | 53 | 53 |
| Blue pigment (Phthalocyanine blue) | 0.006 | 0.018 | 0.026 | 0.026 | 0.087 | 0.026 | 0.0039 | 0.026 |
| Red pigment (Quinacridone magenta) | 0.006 | 0.014 | 0.017 | 0.0065 | 0.023 |  | 0.0047 | 0.0043 |
| Violet pigment |  |  |  |  |  | 0.017 |  |  |
| Blue pigment/Red pigment | 1.00 | 1.29 | 1.53 | 4.00 | 3.78 |  | 0.83 | 6.05 |

On the golf ball obtained by a conventional method, the above white paint was coated. Thereafter, the color tone was measured by a colorimeter and further visually observed. The kind of the paint used and test results are shown in Table 2, below.

TABLE 2

|  | Example No. |  |  |  |  | Comparative Example No. |  |  |
|---|---|---|---|---|---|---|---|---|
|  | 1 | 2 | 3 | 4 | 5 | 1 | 2 | 3 |
| Paint (Color tone) | A | B | C | D | E | F | G | H |
| Wcie | 101.7 | 109.3 | 114.1 | 110.3 | 118.6 | 105.6 | 95.1 | 108.2 |
| Tw | 0.8 | 3.1 | 4.5 | 5.1 | 5.6 | 7.0 | 0.4 | 6.4 |
| Tw/Wcie | 0.0078 | 0.028 | 0.039 | 0.046 | 0.047 | 0.066 | 0.0042 | 0.059 |
| a Value | 0.43 | 0.23 | 0.19 | 0.11 | 0.01 | −1.79 | 1.00 | −2.07 |
| Feature of appearance | 3 | 3 | 4 | 4 | 3 | 2 | 1 | 2 |

Test method (1) Measurement of color tone

Colorimeter CR221 manufactured by Minolta Co. (visual field of 2°, 3 mmφ, light source $D_{65}$), according to Y×y measurement Formulas of whiteness (Wcie), blueness (Tw) and redness (a) of CIE.ISO are as follows:

$$Wcie = Y + 800 (X_0 - X) + 1700 (Y_0 - Y)$$

$$Tw = 1000 (X_0 - X) - 650 (Y_0 - Y)$$

$$a (JIS\ Z8730) = 500 (X/X_0)^{1/3} - (Y/Y_0)^{1/3}$$

wherein $X_0$ and $Y_0$ are respectively chromaticity coordinate of perfect diffuser of $D_{65}$ lighting, $X_0$ is 0.3127 and $Y_0$ is 0.3291.

(2) Visual observation (feature of appearance)

Whiteness was evaluated by 200 random panelists according to the following criteria:
4: considerably white
3: white
2: white but contains some other color
1: yellowish white

What is claim is:

1. A coated golf ball in which the body thereof is coated with a white paint containing titanium oxide as a main pigment, said white paint comprising 45 to 60% by weight of titanium oxide, 0.005 to 0.20% by weight of a blue pigment and 0.001 to 0.06% by weight of a red pigment, based on 100% by weight of the solid content of the coating, and the weight ratio of the blue pigment to the red pigment being 0.9 to 5.

2. The coated golf ball according to claim 1, wherein the color tone of said coated golf ball has a Tw value of not more than 10, an a value of 0.01 to 0.6 and a Tw/Wcie value of 0,005 to 0.05.

3. The coated golf ball according to claim 1 or 2, wherein the golf ball body is a one-piece golf ball made from a cis-1,4-polybutadiene rubber.

4. The coated golf ball according to claim 1 or 2, wherein the golf ball body is a thread wound golf ball comprising a thread wound core and a cover layer provided thereon, said cover layer containing transpolyisoprene.

5. The coated golf ball of claim 1, wherein the white paint is selected from the group consisting of an epoxy, an acrylic, and a urethane paint.

6. The coated golf ball of claim 1, wherein titanium oxide is present in an amount of 50 to 55% by weight.

7. The coated golf ball of claim 1, further containing 0.1 to 10% by weight of various additives.

8. The coated golf ball of claim 1, wherein the blue pigment is present in an amount of 0.01 to 0.08% by weight.

9. The coated golf ball of claim 1, wherein the red pigment is present in an amount of 0.008 to 0.04% by weight.

10. The coated golf ball of claim 1, wherein the white paint is applied to the golf ball body in a thickness of 5 to 30 μm.

11. The coated golf ball of claim 1, wherein the a value is 0.1 to 0.5 and the Tw/Wcie is 0.02 to 0.04.

* * * * *